(12) United States Patent
Fukaya

(10) Patent No.: US 6,883,651 B2
(45) Date of Patent: Apr. 26, 2005

(54) DUST COVER RECEIVING STRUCTURE OF HYDRAULIC SHOCK ABSORBER

(75) Inventor: Yukio Fukaya, Saitama (JP)

(73) Assignee: Showa Corporation, Gyoda (JP)

( * ) Notice: Subject to any disclaimer, the term of this patent is extended or adjusted under 35 U.S.C. 154(b) by 0 days.

(21) Appl. No.: 10/378,519

(22) Filed: Mar. 3, 2003

(65) Prior Publication Data

US 2003/0209395 A1 Nov. 13, 2003

(30) Foreign Application Priority Data

May 8, 2002 (JP) ........................................ 2002-133301

(51) Int. Cl.[7] .............................. F16F 1/06; F16F 9/38; F16F 9/32
(52) U.S. Cl. .................. 188/322.12; 267/221; 267/122; 267/170; 267/33; 267/286; 280/124.151
(58) Field of Search ................... 280/124.155, 124.179, 280/124.151; 267/33, 34, 35, 219–220, 221, 122, 64.27, 286–294, 179, 170, 178; 188/322.12; 277/636

(56) References Cited

U.S. PATENT DOCUMENTS

| | | | | |
|---|---|---|---|---|
| 5,676,355 A | * | 10/1997 | Hayashi et al. | ............. 267/221 |
| 2003/0209395 A1 | * | 11/2003 | Fukaya | .................. 188/322.12 |
| 2003/0218286 A1 | * | 11/2003 | Miyazaki et al. | ........... 267/220 |

FOREIGN PATENT DOCUMENTS

| | | | |
|---|---|---|---|
| FR | 2660719 | * | 10/1991 |
| JP | 6-82446 | | 11/1994 |
| JP | 2535936 | | 2/1997 |
| JP | 3096006 B2 | | 8/2000 |
| JP | 2000-266102 | * | 9/2000 |
| JP | 2002-31181 | * | 1/2002 |
| JP | 2003-322192 | * | 11/2003 |
| JP | 2003-343634 | * | 12/2003 |

OTHER PUBLICATIONS

Machine assisted translation for JP 2002–31181–A.*

* cited by examiner

Primary Examiner—Douglas C. Butler
(74) Attorney, Agent, or Firm—Frishauf, Holtz, Goodman & Chick, P.C.

(57) ABSTRACT

A dust cover receiving structure of a hydraulic shock absorber in which a seat rubber is interposed between a suspension spring and a spring seat. The seat rubber has a spring receiving portion which is arranged between the suspension spring and the spring seat, a centering portion which is fitted to a damper tube and guides an end portion of a dust cover in such a manner as to align the dust cover with an axial center of the damper tube, and a cover receiving portion which is provided between the spring receiving portion and the centering portion, and which receives an end surface of the dust cover.

20 Claims, 3 Drawing Sheets

DUST COVER RECEIVING STRUCTURE OF HYDRAULIC SHOCK ABSORBER

BACKGROUND OF THE INVENTION

1. Field of the Invention

The present invention relates to a dust cover receiving structure of a hydraulic shock absorber.

2. Description of the Related Art

A hydraulic shock absorber having a dust cover which is put on a damper tube and wherein a suspension spring is provided at an outer side of the dust cover, and wherein the dust cover can be supported by a spring seat mounted to the damper tube, is described in Japanese Patent No. 3096006 and Japanese Utility Model No. 2535936.

In the structure described in Japanese Patent No. 3096006, the spring seat is provided with a centering portion which guides an end portion of the dust cover in such a manner as to make the dust cover coaxial with the damper tube, and a cover receiving portion which supports the end surface of the dust cover. The centering portion prevents the dust cover from bowing, and prevents the dust cover from being in contact with the suspension spring and the damper tube.

However, according to the structure described in Japanese Patent No. 3096006, since the centering portion and the cover receiving portion are provided in the spring seat itself, the end portion of the dust cover is directly in contact with the spring seat. Thus, a coating of the spring seat rubs out, and it is impossible to protect a surface of the spring seat. Further, since the cover receiving portion is provided in the spring seat itself, the spring seat becomes large.

Further, in the structure described in Japanese Utility Model No. 2535936, a seat rubber is interposed between the suspension spring and the spring seat, and the end portion of the dust cover is connected and fixed to the seat rubber. Thereby it is possible to prevent the dust cover from bowing and it is possible to prevent the end portion of the dust cover from being in contact with the spring seat.

However, according to the structure described in Japanese Utility Model No. 2535936, since it is necessary to connect and fix the end portion of the dust cover to the seat rubber in a narrow space between the damper tube and the suspension spring, the assembling time is increased, and the assembling properties are poor. This becomes particularly significant in a hydraulic shock absorber in which a diameter of the suspension spring is small, such as a rear damper.

SUMMARY OF THE INVENTION

An object of the present invention is to protect a surface of a spring seat as well as to prevent a dust cover from bowing while enabling downsizing of a spring seat, in a hydraulic shock absorber in which an end portion of the dust cover is supported by the spring seat.

According to the present invention, a dust cover receiving structure of a hydraulic shock absorber comprises a dust cover having one end portion fixed to a side of a piston rod, the piston rod being coupled to a damper tube, a suspension spring provided at an outer side of the dust cover and which is to be supported to a spring seat mounted to the damper tube, and a seat rubber interposed between the suspension spring and the spring seat.

The seat rubber has a spring receiving portion which is arranged and clamped between the suspension spring and the spring seat, a centering portion which is fitted to the damper tube and which guides another end portion of the dust cover so as to align the dust cover with an axial center of the damper tube, and a cover receiving portion which is provided between the spring receiving portion and the centering portion and which receives an end surface of the dust cover at the another end portion of the dust cover.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

Figure 1:
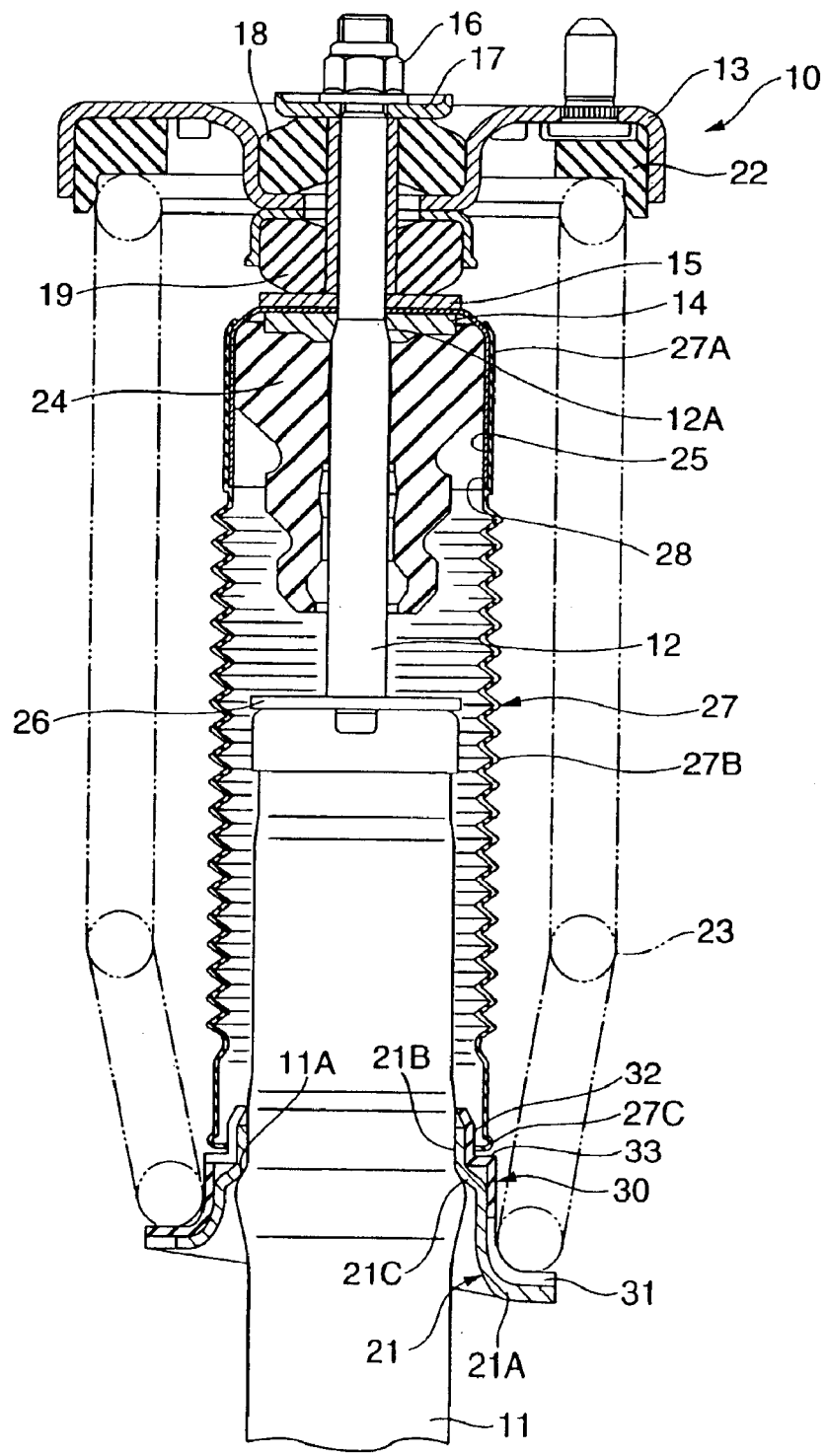
FIG. 1 is a cross sectional view showing a main portion of a hydraulic shock absorber, showing the present invention.

A hydraulic shock absorber 10 is connected to a tire wheel by inserting a piston rod 12 to a cylinder built in a damper tube 11 and arranging a tire wheel side mounting bracket on the damper tube 11, and is mounted to a vehicle body by arranging a vehicle body side mounting bracket 13 to which is connected the piston rod 12 protruding from the damper tube 11, as shown in FIG. 1. In this case, the vehicle body side mounting bracket 13 is provided in a state in which the vehicle body side mounting bracket 13 is clamped by upper and lower annular rubber mount members (mounts) 18 and 19 between a lower washer 15 supported to a cover plate 14 engaged with a step portion 12A of the piston rod 12, and an upper washer 17 supported to a lock nut 16 engaged with an end portion of the piston rod 12.

The hydraulic shock absorber 10 is surrounded by a suspension spring 23 which is arranged between a lower spring seat 21 which is press inserted onto an outer periphery of the damper tube 11 and is engaged with a step portion 11A, and an upper spring seat 22 which is held in the vehicle body side mounting bracket 13.

The hydraulic shock absorber 10 is provided with a rubber bumper member 24 (bump rubber) inserted and attached so as to press itself against a portion of the piston rod 12 which is below the cover plate 14. The bump rubber 24 is covered with a steel cup 25 and is restricted in deformation in a diametrical direction. The steel cup 25 is clamped between the cover plate 14 and the lower washer 15. The hydraulic shock absorber 10 collides with and aligns the bump rubber 24 with a bump stopper cap 26 on an upper end surface of the damper tube 11 so as to restrict a maximum compression stroke at a time of maximum compression.

That is, the hydraulic shock absorber 10 is expanded and contracted in such a manner as to absorb an impact force applied to a vehicle from a road surface by an elastic force of the suspension spring 23. Further, the hydraulic shock absorber 10 is structured so as to quickly restrict a stretching vibration thereof based on a damping force generated by a piston valve apparatus provided in a piston, a base valve apparatus provided in a cylinder and the like, at a time when the piston rod 12 vertically moves in correspondence to the expansion and contraction thereof.

The hydraulic shock absorber 10 is covered with a dust cover 27 made of rubber or resin, in such a manner as to surround the damper tube 11, and the piston rod 12 protruding from the damper tube 11. The dust cover 27 is fixed to the steel cup 25 in a come-off prevention state, by putting a cup-shaped mounting portion 27A on the steel cup 25 and engaging a plurality of protruding groove portions 28, provided so as to protrude inward at a plurality of positions in a peripheral direction of an inner periphery of a lower end in the cup-shaped mounting portion 27A, with a lower end surface of the steel cup 25. Further, the dust cover 27 has a bellows portion 27B connected to the cup-shaped mounting portion 27A and extending in such a manner as to cover a periphery of the damper tube 11 from a periphery of the bump rubber 24, and is provided with a cylindrical hanging portion 27C at a lower end side of the bellows portion 27B. A lower end portion of the hanging portion 27C comprises a ring-like protruding groove portion bulged so as to have a C-shaped cross section, but it may be formed in a straight shape having no protruding groove portion.

The dust cover 27 vertically moves in correspondence to the expansion and contraction of the piston rod 12. The lower end portion of the hanging portion 27C moves upward to a position near to the bump stopper cap 26 from a side of the lower spring seat 21 so as to expand the bellows portion 27B at a time when the piston rod 12 expands. The lower end portion of the hanging portion 27C moves downward so as to be collided and aligned with a cover receiving portion 33 of a seat rubber 30 (described below) at a side of the lower spring seat 21 at a time when the piston rod 12 is contracted, thereby compressing the bellows portion 27B.

Figure 2:
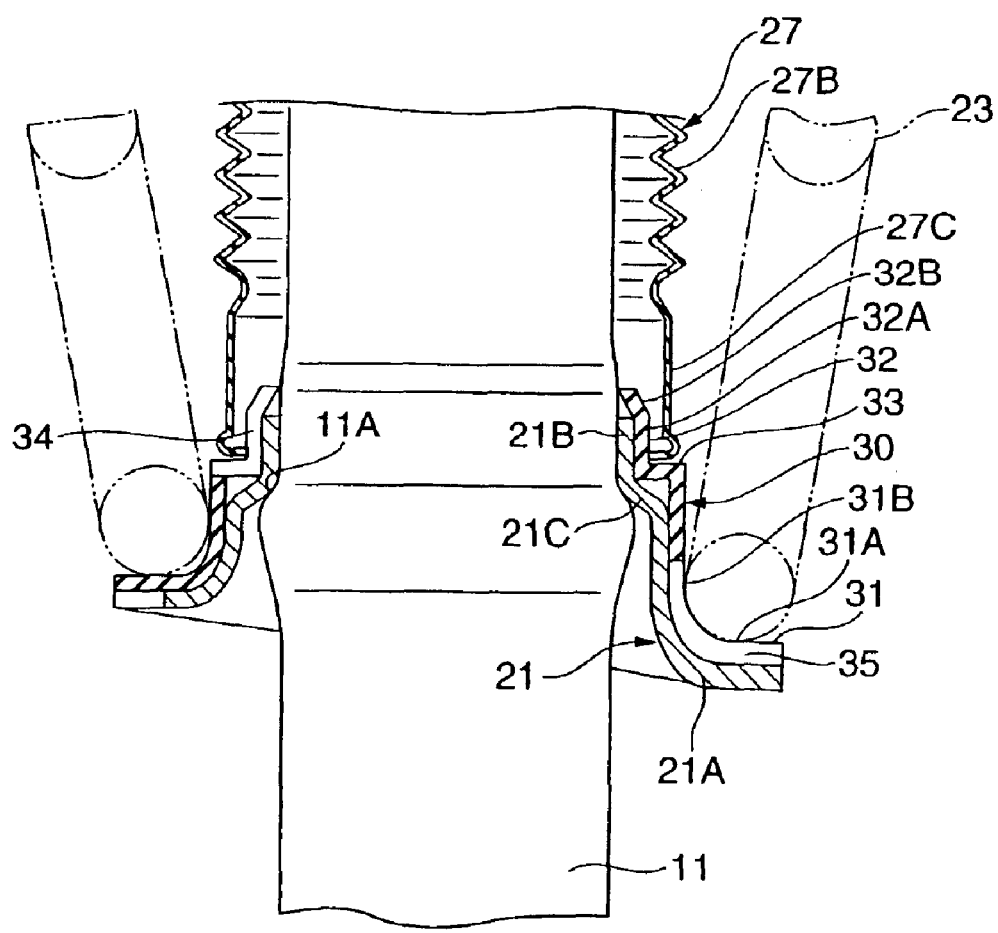
FIG. 2 is an enlarged view of a part of the main portion shown in FIG. 1.

The hydraulic shock absorber 10 has a seat rubber 30 interposed between the lower end of the suspension spring 23 and the lower spring seat 21, as shown in FIGS. 1 and 2. The seat rubber 30 is attached to the lower spring seat 21.

The lower spring seat 21 is provided with a spring support portion 21A which extends along one coil at a terminal end of the suspension spring 23, and supports an end surface at the terminal end of the suspension spring 23. The spring support seat 21 keeps an inner diameter at the terminal end of the suspension spring 23 under restraint. The spring support seat 21 also has an annular mounting portion 21B which is press connected to a portion of the damper tube 11 which is above the step portion 11A, and a taper portion 21C which is provided between the spring support portion 21A and the annular mounting portion 21B so as to be engaged by the step portion 11A.

Figure 3:
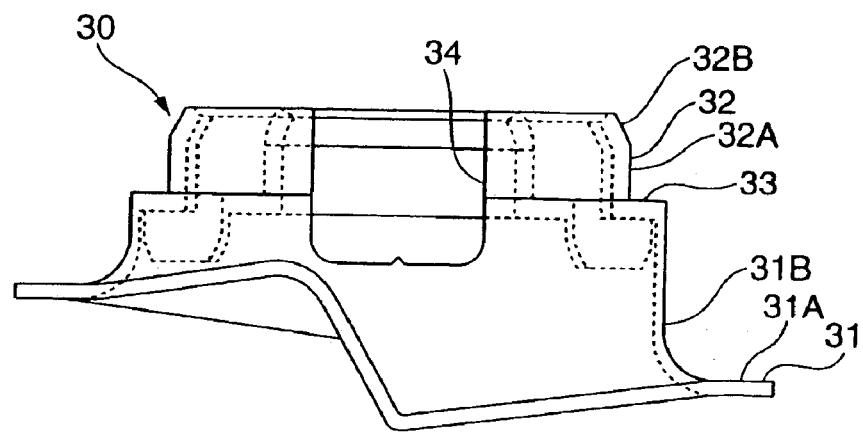
FIG. 3 is an enlarged view showing a seat rubber member of the present invention.
Figure 4:
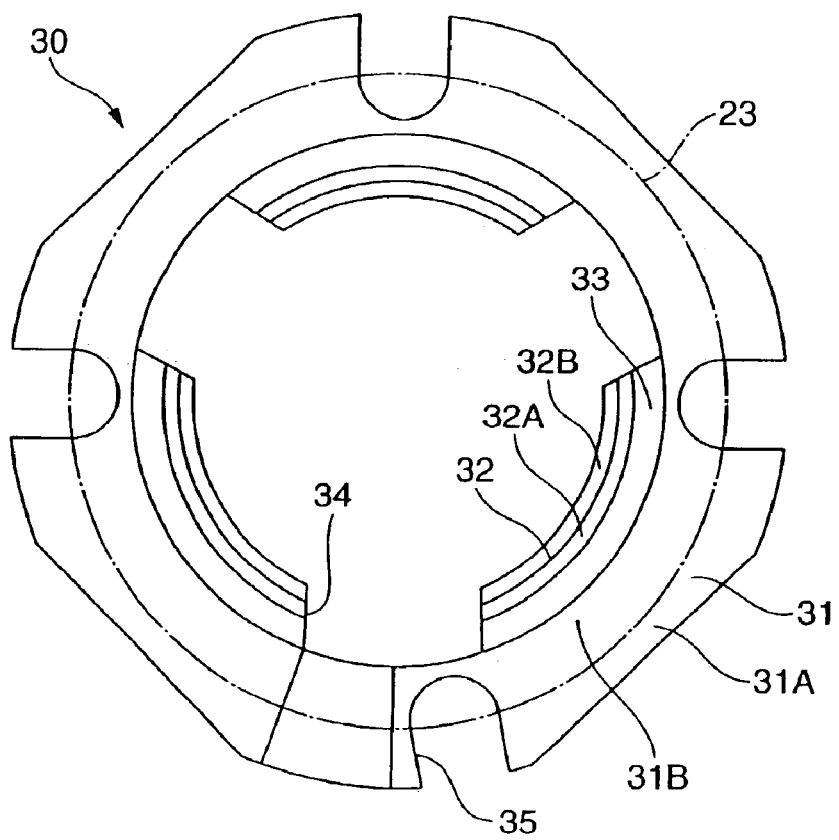
FIG. 4 is a top plan view of the seat rubber member shown in FIG. 3.

Further, as shown in FIGS. 3 and 4, the seat rubber 30 has a spring receiving portion 31 which is fixed in a state of being clamped by the suspension spring 23 and the lower spring seat 21, a centering portion 32 which is fitted to the damper tube 11 and guides the lower end portion of the hanging portion 27C of the dust cover 27 so as to align the dust cover 27 with an axial center of the damper tube 11, and a cover receiving portion 33 which is provided between the spring receiving portion 31 and the centering portion 32 so as to receive the lower end portion of the hanging portion 27C in the dust cover 27.

The spring receiving portion 31 has a seat portion 31A which is attached to the spring support portion 21A of the lower spring seat 21, extends along one coil at a terminal end of the suspension spring 23 and directly supports an end surface of the suspension spring 23 at the terminal end, and a rising portion 31B which rises up from the seat portion 31A and directly keeps the inner diameter at the terminal end of the suspension spring 23 under restraint.

The centering portion 32 has an annular portion 32A which is attached to the annular mounting portion 21B of the lower spring seat 21, and a taper portion 32B which is contracted so as to be close to an outer periphery of the damper tube 11 from the annular portion 32A toward a leading end side. A leading end of the taper portion 32B is closely attached to the outer periphery of the damper tube 11.

The cover receiving portion 33 is provided so as to connect an upper end portion of the rising portion 31B in the spring receiving portion 31 to a lower end portion of the annular portion 32A in the centering portion 32, and is formed in a flat shape which receives a lower end surface of the hanging portion 27C of the dust cover 27. An inner diameter portion of the cover receiving portion 33 (a lower end portion of the annular portion 32A) is supported in a state of being in contact with a root portion of the taper portion 21C with respect to the annular mounting portion 21B of the lower spring seat 21.

Notch portions 34 for weakening a fitting force of the centering portion 32 to the damper tube 11 and carrying out an air vent and a water discharge in the dust cover 27 are provided in the centering portion 32 and the cover receiving portion 33. The notch portions 34 are provided at a plurality of positions, three positions shown in the illustrated embodiment, along a whole periphery of the spring receiving portion 31, and separate the centering portion 32 and the cover receiving portion 33 into three sections in a peripheral direction thereof.

Drains 35 for carrying out a water discharge of an inner peripheral side of the terminal end of the suspension spring 23 are notched and formed in the spring receiving portion 31. The water drains 35 are provided at a plurality of positions, four positions shown in the illustrated embodiment, along a whole periphery of the spring receiving portion 31.

Accordingly, in the hydraulic shock absorber 10, the dust cover 27 is vertically moved in correspondence to the expansion and contraction of the piston rod 12, the hanging portion 27C of the dust cover 27 is moved apart from the cover receiving portion 33 of the seat rubber 30 at a time when the piston rod 12 is expanded, the periphery of the damper tube 11 is moved upward close to the bump stopper cap 26, and the bellows portion 27B is expanded. When the piston rod 12 is contracted, the lower end portion of the hanging portion 27C of the dust cover 27 is guided by the taper portion 32B to the annular portion 32A of the centering portion 32 in the seat rubber 30, and the dust cover 27 is moved downward while being aligned with the axial center of the damper tube 11, thereby preventing the dust cover 27 from bowing. Further, in a final stage of the contraction of the piston guide 12, the lower end surface of the hanging portion 27C of the downward moving dust cover 27 is received by the cover receiving portion 33 of the seat rubber 30, and the bellows portion 27B is compressed.

According to the present embodiment, the following effects can be obtained.

(1) Since the centering portion 32 and the guide receiving portion 33 are provided in the seat rubber 30 without relation to the shape of the spring seat 21, it is possible to simplify a formed shape of the spring seat 21 and downsize the spring seat 21. This is particularly useful in that the centering portion 32 and the cover receiving portion 33 can be simultaneously and extremely easily arranged in a narrow space between the damper tube 11 and the suspension spring 23, even in a hydraulic shock absorber 10 having a small diameter in which the diameter of the suspension spring 23 is made small, such as a rear damper.

(2) The dust cover 27 vertically moves in correspondence to the expansion and contraction of the piston rod 12, and the bowing of the dust cover 27 is prevented by the centering portion 32 which centers the dust cover 27, at a time when the dust cover 27 is compressed by receiving the end portion of the dust cover 27 by the spring seat 21. Accordingly, it is possible to prevent the dust cover 27 from being brought into contact with the suspension spring 23 and the damper tube 11, thereby preventing the dust cover 27 from being damaged.

(3) The end portion of the dust cover 27, centered by the centering portion 32, is supported by the cover receiving portion 33, and is not directly in contact with the spring seat 21. Accordingly, the surface of the spring seat 21 is protected by the cover receiving portion 33, and it is possible to avoid the rubbing of the coating of the spring seat 21.

(4) The centering portion 32 is provided with the taper portion 32B which is compressed so as to be close to the outer periphery of the damper tube 11 toward the leading end side. Accordingly, it is possible to guide the end portion of the dust cover 27 by the taper portion 32B so as to smoothly center the dust cover 27 (refer to item (2) above), at a time when the dust cover 27 moves downward in correspondence to the contraction of the piston rod 12.

(5) Since the cover receiving portion 33 is formed in a flat shape, the end portion of the dust cover 27, centered as described in item (3) above, is stably supported by the flat-shaped cover receiving portion 33, and the centering state of the dust cover 27 is not disturbed. When the end portion of the dust cover 27 is constituted by a circular ring protruding groove portion in which a cross section is bulged in a C shape (as shown in FIGS. 1 and 2), the flat-shaped cover receiving portion 33 more stably supports the end portion of the dust cover 27.

(6) Since the notch portion 34 is provided in the centering portion 32, it is possible to weaken the fitting force of the centering portion 32 applied to the damper tube 11 so as to improve an assembling property of the seat rubber 30. Further, since the notch portion 34 crossing over from the centering portion 32 to the cover receiving portion 33 is provided, it is possible to vent air from the inner portion of the dust cover 27 at the compressing time when the end portion of the dust cover 27 is supported to the cover receiving portion 33, and water discharge can be also carried out.

(7) Since the spring receiving portion 31 keeps the inner diameter of the suspension spring 23 under restraint, it is possible to make the diameter of the suspension spring 23 small, and it is consequently possible to make the diameter of the hydraulic shock absorber 10 small.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

As described above, according to the present invention, in the hydraulic shock absorber in which the end portion of the dust cover is received by the spring seat, it is possible to protect the surface of the spring seat as well as to prevent the dust cover from bowing while enabling downsizing of the spring seat.

Although the invention has been illustrated and described with respect to exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A dust cover receiving structure of a hydraulic shock absorber, said dust cover receiving structure comprising:
    a dust cover places on a damper tube and having one end portion fixed to a side of a piston rod;
    a suspension spring provided at an outer side of the dust cover and supported by a spring seat mounted on the damper tube; and
    a seat rubber interposed between the suspension spring and the spring seat,
    wherein the seat rubber comprises:
        a spring receiving portion which is arranged and clamped between the suspension spring and the spring seat,
        a centering portion which is fitted to the damper tube and which guides another end portion of the dust cover so as to align the dust cover with an axial center of the damper tube, and
        a cover receiving portion which is provided between the spring receiving portion and the centering portion and which receives an end surface of the dust cover at said another end portion of the dust cover; and
    wherein the end surface of said another end portion of the dust cover moves into contact with the cover receiving portion when the hydraulic shock absorber contracts, and moves out of contact with the cover receiving portion when the hydraulic shock absorber expands.

2. A dust cover receiving structure of a hydraulic shock absorber as claimed in claim 1, wherein the centering portion is provided with a taper portion which is contracted so as to be close to an outer periphery of the damper tube toward a leading end side of the centering portion.

3. A dust cover receiving structure of a hydraulic shock absorber as claimed in claim 1, wherein the cover receiving portion has a flat shape.

4. A dust cover receiving structure of a hydraulic shock absorber as claimed in claim 2, wherein the cover receiving portion has a flat shape.

5. A dust cover receiving structure of a hydraulic shock absorber as claimed in claim 1, wherein notch portions are provided in the centering portion and the cover receiving portion.

6. A dust cover receiving structure of a hydraulic shock absorber as claimed in claim 2, wherein notch portions are provided in the centering portion and the cover receiving portion.

7. A dust Cover receiving structure of a hydraulic shock absorber as claimed in claim 3, wherein notch portions are provided in the centering portion and the cover receiving portion.

8. A dust cover receiving structure of a hydraulic shock absorber as claimed in claim 4, wherein notch portions are provided in the centering portion and the cover receiving portion.

9. A dust cover receiving structure of a hydraulic shock absorber as claimed in claim 1, wherein the spring receiving portion is arranged to keep an inner diameter of the suspension spring under restraint.

10. A dust cover receiving structure of a hydraulic shock absorber as claimed in claim 2, wherein the spring receiving portion is arranged to keep an inner diameter of the suspension spring under restraint.

11. A dust cover receiving structure of a hydraulic shock absorber as claimed in claim 3, wherein the spring receiving portion is arranged to keep an inner diameter of the suspension spring under restraint.

12. A dust cover receiving structure of a hydraulic shock absorber as claimed in claim 4, wherein the spring receiving portion is arranged to keep an inner diameter of the suspension spring under restraint.

13. A dust cover receiving structure of a hydraulic shock absorber as claimed in claim 5, wherein the spring receiving portion is arranged to keep an inner diameter of the suspension spring under restraint.

14. A dust cover receiving structure of a hydraulic shock absorber as claimed in claim 6, wherein the spring receiving portion is arranged to keep an inner diameter of the suspension spring under restraint.

15. A dust cover receiving structure of a hydraulic shock absorber as claimed in claim 7, wherein the spring receiving portion is arranged to keep an inner diameter of the suspension spring under restraint.

16. A duet cover receiving structure of a hydraulic shock absorber as claimed in claim 8, wherein the spring receiving portion is arranged to keep an inner diameter of the suspension spring under restraint.

17. A dust cover receiving structure of a hydraulic shock absorber as claimed in claim 1, wherein said another end portion of the dust cover comprises a circular ring protruding groove portion which bulges outward so as to have a C shape in cross section.

18. A dust cover receiving structure of a hydraulic shock absorber as claimed in claim 1, wherein at least one water discharge drain is formed at a position along a periphery of the spring receiving portion.

19. A dust cover receiving structure of a hydraulic shock absorber as claimed in claim 18, wherein said at least one water discharge drain comprises a notch formed at a position along the periphery of the spring receiving portion to drain away water from an inner peripheral side of a terminal end of the suspension spring.

20. A dust cover receiving structure of a hydraulic shock absorber as claimed in claim 19, wherein said at least one water discharge drain comprises a plurality of said notches spaced apart along a whole periphery of the spring receiving portion.

* * * * *